US012565842B2

(12) United States Patent 
Konitzer et al.

(10) Patent No.: US 12,565,842 B2 
(45) Date of Patent: Mar. 3, 2026

(54) AIRFOIL HAVING A FILM HOLE

(71) Applicant: GENERAL ELECTRIC COMPANY, Schenectady, NY (US)

(72) Inventors: Douglas Gerard Konitzer, West Chester, OH (US); Ronald Scott Bunker, West Chester, OH (US); Robert David Briggs, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/337,841

(22) Filed: Jun. 20, 2023

(65) Prior Publication Data

US 2024/0159151 A1 May 16, 2024

Related U.S. Application Data

(63) Continuation of application No. 16/869,831, filed on May 8, 2020, now abandoned, which is a continuation (Continued)

(51) Int. Cl.
| | |
|---|---|
| *F01D 5/18* | (2006.01) |
| *F01D 5/14* | (2006.01) |
| *F01D 25/00* | (2006.01) |

(52) U.S. Cl.
CPC ............. *F01D 5/186* (2013.01); *F01D 5/147* (2013.01); *F01D 5/187* (2013.01); *F01D 25/002* (2013.01);

(Continued)

(58) Field of Classification Search
CPC .......... F01D 5/186; F01D 5/147; F01D 5/187; F01D 25/002; F05D 2220/323;

(Continued)

(56) References Cited

U.S. PATENT DOCUMENTS

| | | |
|---|---|---|
| 3,995,422 A | 12/1976 | Stamm |
| 4,384,823 A | 5/1983 | Graham et al. |

(Continued)

FOREIGN PATENT DOCUMENTS

| | | |
|---|---|---|
| CN | 1963157 A | 5/2007 |
| CN | 203532010 U | 4/2014 |

(Continued)

OTHER PUBLICATIONS

Scheurlen et al. WO 9837310 Espacenet—English Machine Translation (Year: 1998).*

(Continued)

*Primary Examiner* — Nathaniel E Wiehe 
*Assistant Examiner* — Wayne A Lambert 
(74) *Attorney, Agent, or Firm* — Hanley, Flight & Zimmerman, LLC

(57) ABSTRACT

A method and apparatus for minimizing engine weight for a turbine engine by utilizing one or more discrete protuberances disposed on an engine component wall. The wall can have a nominal thickness to decrease engine weight while the protuberances can provide increased discrete thicknesses for providing one or more cooling holes. The increased thickness at the protuberances provides for an increased thickness to provide sufficient length to increase cooling hole effectiveness.

20 Claims, 7 Drawing Sheets

Related U.S. Application Data of application No. 15/138,624, filed on Apr. 26, 2016, now abandoned.

(52) U.S. Cl.
CPC .... *F05D 2220/323* (2013.01); *F05D 2230/20* (2013.01); *F05D 2240/30* (2013.01); *F05D 2250/185* (2013.01); *F05D 2250/232* (2013.01); *F05D 2260/202* (2013.01); *F05D 2260/22141* (2013.01); *Y02T 50/60* (2013.01)

(58) Field of Classification Search
CPC ............. F05D 2230/20; F05D 2240/30; F05D 2250/185; F05D 2250/232; F05D 2260/202; F05D 2260/22141; Y02T 50/60; F02C 7/12
See application file for complete search history.

(56) References Cited

U.S. PATENT DOCUMENTS

| | | | |
|---|---|---|---|
| 4,485,630 | A | 12/1984 | Kenworthy |
| 4,655,044 | A | 4/1987 | Dierberger et al. |
| 4,770,608 | A | 9/1988 | Anderson et al. |
| 4,992,025 | A * | 2/1991 | Stroud .................... F01D 5/186 415/115 |
| 5,281,084 | A | 1/1994 | Noe et al. |
| 5,309,636 | A | 5/1994 | McGovern et al. |
| 5,382,133 | A | 1/1995 | Moore et al. |
| 5,405,242 | A * | 4/1995 | Auxier .................... F01D 5/147 415/115 |
| 5,419,039 | A | 5/1995 | Auxier et al. |
| 5,498,133 | A | 3/1996 | Lee |
| 5,624,231 | A | 4/1997 | Ohtomo et al. |
| 5,660,523 | A | 8/1997 | Lee |
| 5,688,104 | A | 11/1997 | Beabout |
| 5,700,131 | A | 12/1997 | Hall et al. |
| 6,000,908 | A | 12/1999 | Bunker |
| 6,022,188 | A | 2/2000 | Bancalari |
| 6,050,777 | A | 4/2000 | Tabbita et al. |
| 6,099,251 | A | 8/2000 | LaFleur |
| 6,241,468 | B1 | 6/2001 | Lock et al. |
| 6,265,022 | B1 | 7/2001 | Fernihough et al. |
| 6,383,602 | B1 * | 5/2002 | Fric ........................ F01D 5/186 427/454 |
| 6,435,815 | B2 | 8/2002 | Harvey et al. |
| 6,471,479 | B2 | 10/2002 | Starkweather |
| 6,547,524 | B2 | 4/2003 | Kohli et al. |
| 6,675,582 | B2 | 1/2004 | Monty et al. |
| 6,837,683 | B2 | 1/2005 | Dailey |
| 6,932,572 | B2 | 8/2005 | Kohli et al. |
| 7,137,781 | B2 | 11/2006 | Harvey et al. |
| 7,744,347 | B2 | 6/2010 | Cunha et al. |
| 7,820,267 | B2 | 10/2010 | Fahndrich |
| 7,887,294 | B1 | 2/2011 | Liang |
| 8,066,482 | B2 | 11/2011 | Strohl et al. |
| 8,092,176 | B2 | 1/2012 | Liang |
| 8,291,709 | B2 | 10/2012 | Cayre et al. |
| 8,628,292 | B2 * | 1/2014 | Maltson .................. F23R 3/002 415/115 |
| 8,672,613 | B2 | 3/2014 | Bunker |
| 8,915,713 | B2 * | 12/2014 | Boyer ..................... F01D 5/186 416/232 |
| 9,062,884 | B2 * | 6/2015 | Rudrapatna .............. F23R 3/06 |
| 9,091,176 | B2 | 7/2015 | Martin et al. |
| 9,360,215 | B2 | 6/2016 | McKenzie et al. |
| 9,376,919 | B2 | 6/2016 | Fujimoto |
| 9,382,811 | B2 | 7/2016 | Harding |
| 9,782,829 | B2 | 10/2017 | Morris et al. |
| 9,863,254 | B2 | 1/2018 | Ceglio et al. |
| 10,077,667 | B2 * | 9/2018 | Lewis ..................... F01D 9/041 |
| 10,101,030 | B2 | 10/2018 | Dudebout et al. |
| 10,309,228 | B2 * | 6/2019 | Dutta ...................... F01D 5/189 |
| 10,316,672 | B2 | 6/2019 | Smith et al. |
| 10,443,848 | B2 | 10/2019 | Cunha et al. |
| 10,830,052 | B2 * | 11/2020 | Howe ..................... F01D 5/186 |
| 2005/0042074 | A1 | 2/2005 | Liang |
| 2009/0317258 | A1 | 12/2009 | Tibbott et al. |
| 2010/0040459 | A1 | 2/2010 | Ohkita |
| 2013/0280093 | A1 | 10/2013 | Zelesky et al. |
| 2015/0152734 | A1 | 6/2015 | Ceglio et al. |
| 2015/0315930 | A1 | 11/2015 | Koonankeil et al. |
| 2016/0177738 | A1 | 6/2016 | Moore et al. |
| 2016/0298462 | A1 | 10/2016 | Thornton et al. |
| 2017/0009590 | A1 | 1/2017 | Nilsson |
| 2017/0176012 | A1 | 6/2017 | Lacy |
| 2017/0234146 | A1 | 8/2017 | Bunker et al. |

FOREIGN PATENT DOCUMENTS

| | | | |
|---|---|---|---|
| EP | 0466501 | A2 | 1/1992 |
| EP | 0964981 | A1 | 12/1999 |
| EP | 2584148 | A1 | 4/2013 |
| GB | 2262314 | A | 6/1993 |
| WO | 98/37310 | A1 | 8/1998 |
| WO | 99/14465 | A1 | 3/1999 |
| WO | 2013163150 | A1 | 10/2013 |

OTHER PUBLICATIONS

Scheurlen WO 9914465 Espacenet—English Machine Translation (Year: 1999).*
Office Action issued in connection with corresponding CA Application No. 2964139 on Jun. 5, 2018.
First Office Action and Search issued in connection with corresponding CN Application No. 201110281295.8 on Sep. 9, 2018 (English Translation Unavailable).
Extended European Search Report and Opinion issued in connection with corresponding EP Application No. 1767906.1 dated Sep. 20, 2017.

* cited by examiner

AIRFOIL HAVING A FILM HOLE

CROSS REFERENCE TO RELATED APPLICATIONS

This application is a continuation application of U.S. patent application Ser. No. 16/869,831, filed May 8, 2020, now abandoned, which is a continuation of U.S. patent application Ser. No. 15/138,624, filed Apr. 26, 2016, now abandoned, which are incorporated herein by reference in its entirety.

TECHNICAL FIELD

This disclosure relates generally to a turbine engine, and more specifically to a method of forming at least a portion of a wall of a component of the turbine engine.

BACKGROUND OF THE INVENTION

Turbine engines, and particularly gas or combustion turbine engines, are rotary engines that extract energy from a flow of combusted gases passing through the engine onto a multitude of rotating turbine blades.

Turbine engines for aircraft are often designed to operate at high temperatures to maximize engine efficiency, so cooling of certain engine components can be beneficial or necessary. Typically, cooling is accomplished by ducting cooler air from the high and/or low pressure compressors to the engine components that require cooling. Temperatures in the high pressure turbine can be 1000° C. to 2000° C. and the cooling air from the compressor can be around 500° C. to 700° C. While the compressor air is a high temperature, it is cooler relative to the turbine air, and can be used to cool the turbine.

Contemporary engine components, such as the rotating blades, necessarily account for a portion of the overall engine weight. Decreasing the weight of these engine components is desirable to increase engine efficiency. Decreasing weight of the engine components can be accomplished by utilizing thinner walls for the components, for example. However, thinner walls include a decreased volume through which film holes can extend, which can decrease the effectiveness of the film holes. Thus, it is desirable to utilize thinner walls for the engine components to decrease system weight while providing sufficient length for the film holes to maintain cooling effectiveness.

BRIEF DESCRIPTION OF THE INVENTION

In one aspect, embodiments of the invention relate to a component for a turbine engine, with the turbine engine generating a hot combustion gas flow and providing a cooling fluid flow, the component comprising a wall having a nominal thickness separating the hot combustion gas flow from the cooling fluid flow having a hot surface facing the hot combustion gas flow and a cool surface facing the cooling fluid flow, at least one localized, protuberance extending from the cool surface, and a film hole extending through the protuberance and the wall, having a length greater than the nominal thickness of the wall.

In another aspect, embodiments of the invention relate to an airfoil for a turbine engine comprising a wall having a first side adjacent to a first fluid flow and a second side adjacent to a second fluid flow and having a nominal thickness, at least one localized, protuberance extending from the wall, and a cooling hole extending through the protuberance and the wall, having a length greater than the nominal thickness of the wall.

DESCRIPTION OF EMBODIMENTS OF THE INVENTION

Figure 1:
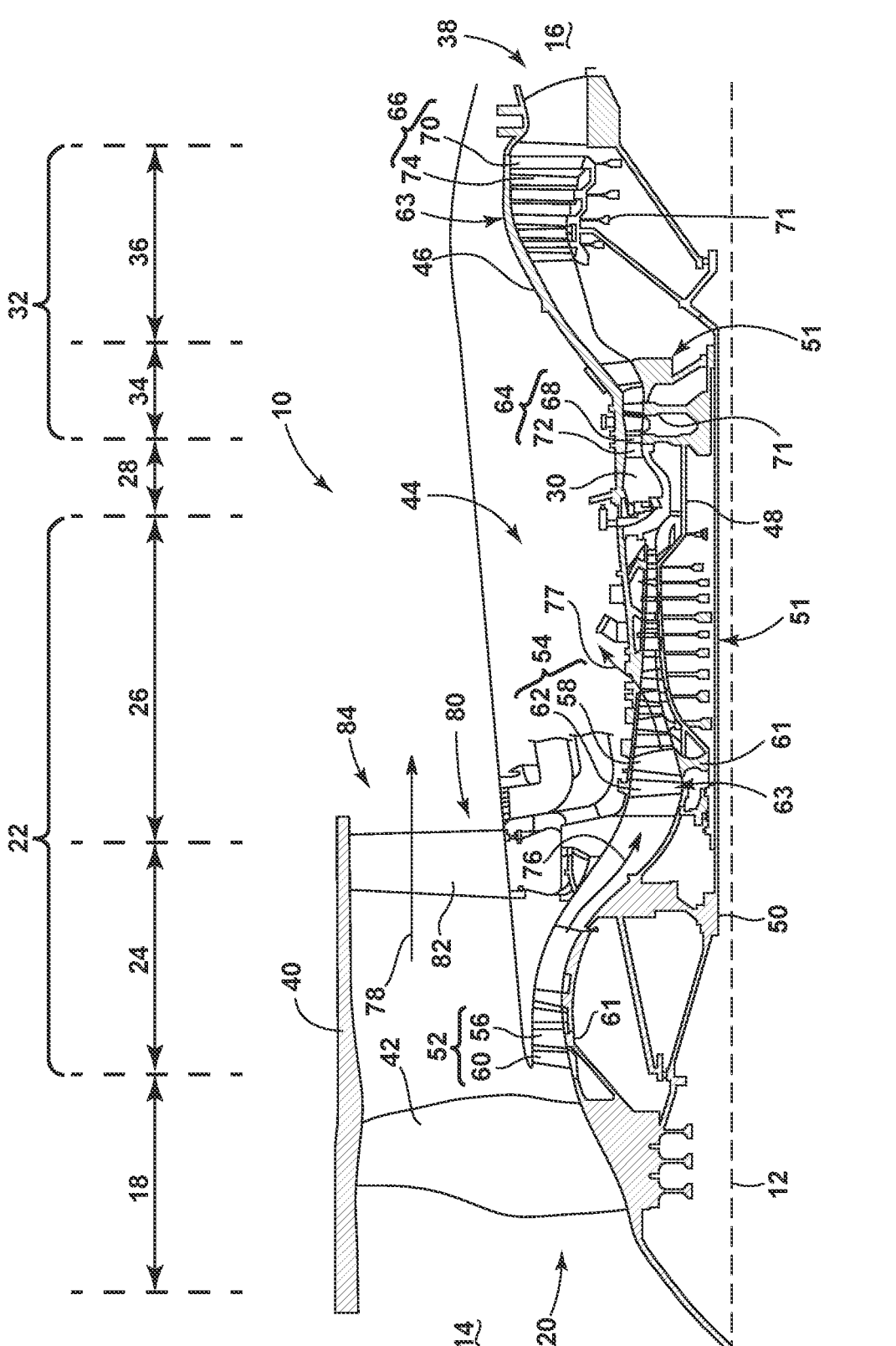
FIG. 1 is a schematic cross-sectional diagram of a gas turbine engine for an aircraft.

The described embodiments of the present invention are directed to an engine component for a turbine engine having at least one protuberance disposed on a wall of the engine component with a film hole extending through the protuberance and the wall. For purposes of illustration, the present invention will be described with respect to the turbine for an aircraft gas turbine engine. It will be understood, however, that the invention is not so limited and may have general applicability within an engine, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
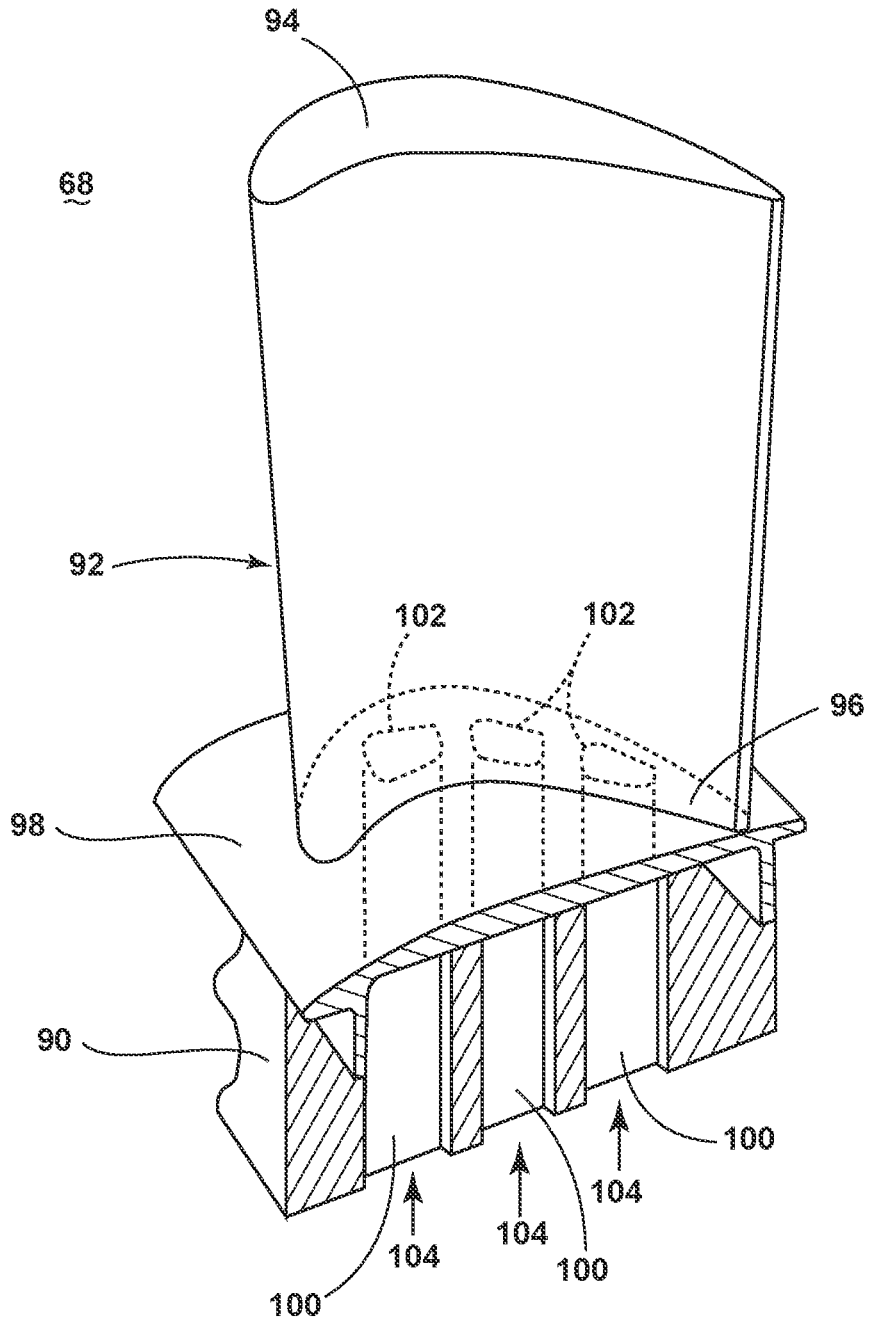
FIG. 2 is an isometric view of an airfoil of the gas turbine engine of FIG. 1.

FIG. 2 is a perspective view of an engine component in the form the turbine blades 68 of the engine 10 of FIG. 1. It should be understood that the turbine blade 68 is exemplary and that the engine component can include other components requiring cooling. The turbine blade 68 includes a dovetail 90 and an airfoil 92. The airfoil 92 includes a tip 94 to a root 96. A span-wise direction can be defined between the tip 94 and the root 96. The dovetail 90 includes a platform 98 and one or more inlet passages 100 having an outlet 102. The dovetail 90 and platform 98 can be integral with the airfoil 92 adjoining at the root 96. The platform 98 helps to radially contain the turbine airflow driven by the airfoil 92. The dovetail 90 can be configured to mount to a turbine rotor disk 71 (FIG. 1) to rotate the airfoil 92 about the engine centerline 10. The inlet passages 100 can be fed with a flow of air, such as bypass air 104. The bypass air 104 is provided to the airfoil 92 at the root 96 exhausting through the outlets 102. It should be appreciated that the dovetail 90 is shown in cross-section, such that the inlet passages 100 are housed within the body of the dovetail 90.

Figure 3:
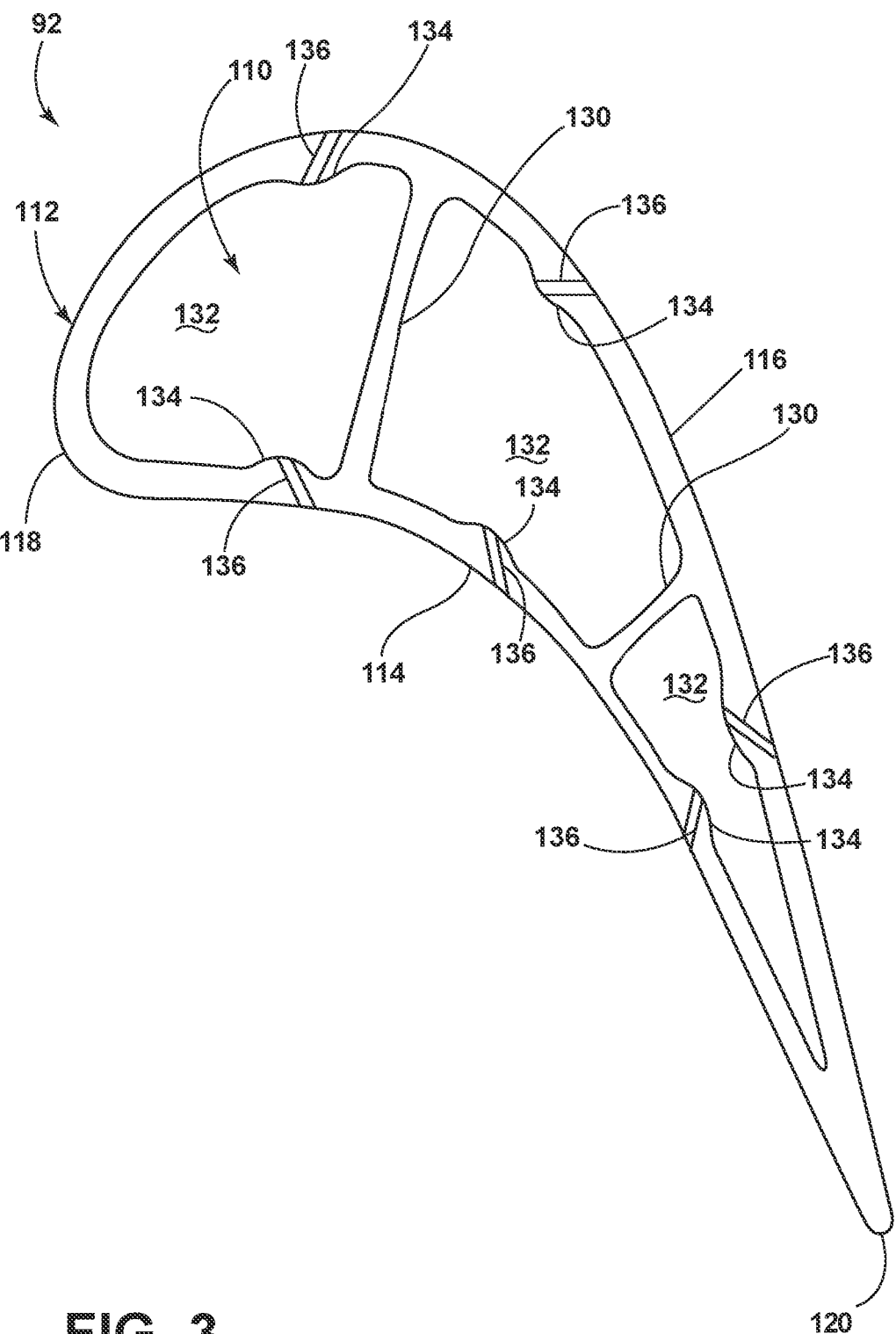
FIG. 3 is a cross-sectional view of the airfoil of FIG. 2 having walls including protuberances with film holes.

Referring to FIG. 3, the airfoil 92, shown in cross-section, has an interior 110 bounded by an outer wall 112. The outer wall 112 includes a concave-shaped pressure sidewall 114 and a convex-shaped suction sidewall 116. A leading edge 118 and a trailing edge 120 are defined at the junction between the pressure and suction sidewalls 114, 116, defining a chord-wise distance between the leading and trailing edges 118, 120. The airfoil 92, when implemented as a rotating blade as compared to a stationary vane, rotates in a direction such that the pressure sidewall 114 follows the suction sidewall 116. Thus, as shown in FIG. 3, the airfoil 92 would rotate upward toward the top of the page.

One or more ribs 130 are included in the interior 110. The ribs 130 can extend between the pressure and suction sidewalls 114, 116 to define internal chambers 132. The chambers 132 can be discrete compartments defined within the airfoil 92. Alternatively, the chambers 132 can be in fluid communication with one another, such as defining a serpentine flow path snaking through the airfoil 92 in the span-wise direction. It should be understood that the ribs 130 and chambers 132 defined by the ribs 130 are exemplary and should not be construed as limiting. It is contemplated that the interior 110 or chambers 132 defined therein can also include a plurality of plenums, circuits, micro-circuits, near wall cooling systems, pin banks, or similar structures in non-limiting examples.

A protuberance 134 can be disposed on the outer wall 112. The protuberances 134 are discrete members, defining an increased thickness for the wall 112. In non-limiting examples, the protuberance can be radiused, rounded, conical, frustoconical, bell-shaped, or non-linear. Additional examples of protuberances can include, but are not limited to, radiused, circular, oval, elliptical, spherical, ellipsoidal, or curvilinear. The protuberances 134 can be integral to the outer wall 112, or can be mounted thereto. In one non-limiting example, the protuberances 134 can be formed on the airfoil 92 using additive manufacturing. Any number of protuberances 134 can be included on the outer wall 112 or the ribs 130 and can be organized in any manner, such as a linear grouping in the span-wise or chord-wise direction, a pattern, or random placement.

Additionally, it is contemplated that the protuberances 134 can be formed on an interior wall of the airfoil 92 or an engine component. In one example, the protuberances 134 can be formed on the rib 130. In other non-limiting examples, the protuberance 134 can be disposed on walls of cooling structures, such as micro-circuits, cooling mesh, plenums, pin banks, or other component structures requiring cooling.

A film hole 136 can extend through the protuberances 134. The film holes 136 can extend through the protuberances 134 on the outer wall 112 to provide a cooling film along the external surface of the outer wall 112 for cooling the airfoil 92. Additionally, in the case where the protuberance 134 is disposed on an interior wall or structure, such as the rib 130 in one non-limiting example, the film hole 136 can be a cooling hole such as a cross-over hole. In additional examples, such a cooling hole can provide a flow of cooling fluid among internal cavities or chambers of the engine component, such as adjacent areas channels or a micro circuit.

The film hole 136 can be shaped to direct a flow of fluid entering the film hole 132, passing through the film hole 132, or exhausting from the film hole 132. Such shaping, for example, can include a converging, diverging, or metering section to direct the flow of fluid, in non-limiting examples. The converging section can increase the flow velocity of the flow of fluid, the diverging section can decrease the flow velocity of the flow of fluid, and the metering section can meter the flow of fluid passing through it. Additional shaping can include an expansion section or a reduction section. The expansion section can include an increasing cross-sectional area to form a diffusion section and the reduction section can include a decreasing cross-sectional area. Additionally, the shaping of the film hole 136 can include a non-linear film hole 136. Such a film hole 136 could include curved passages or follow the curvature of the protuberance 134.

It should be understood that the protuberance 134 could be placed on any wall having opposing flows on opposing sides of the wall 118. Additionally, the film hole 136 can pass through the protuberance to provide a flow between the opposing sides of the wall 118.

In an example where the engine component is not a blade, such as a vane, combustion liner, shroud, or other component requiring cooling, the protuberances can be disposed an any wall, such as an internal or external wall, and can include a film hole to provide a flow of fluid through such a wall for providing a cooling film. Thus, it should be understood that the airfoil 92 as illustrated is exemplary and non-limiting, and the protuberances 134 can have equal applicability in any other engine component utilizing film holes.

Figure 4:
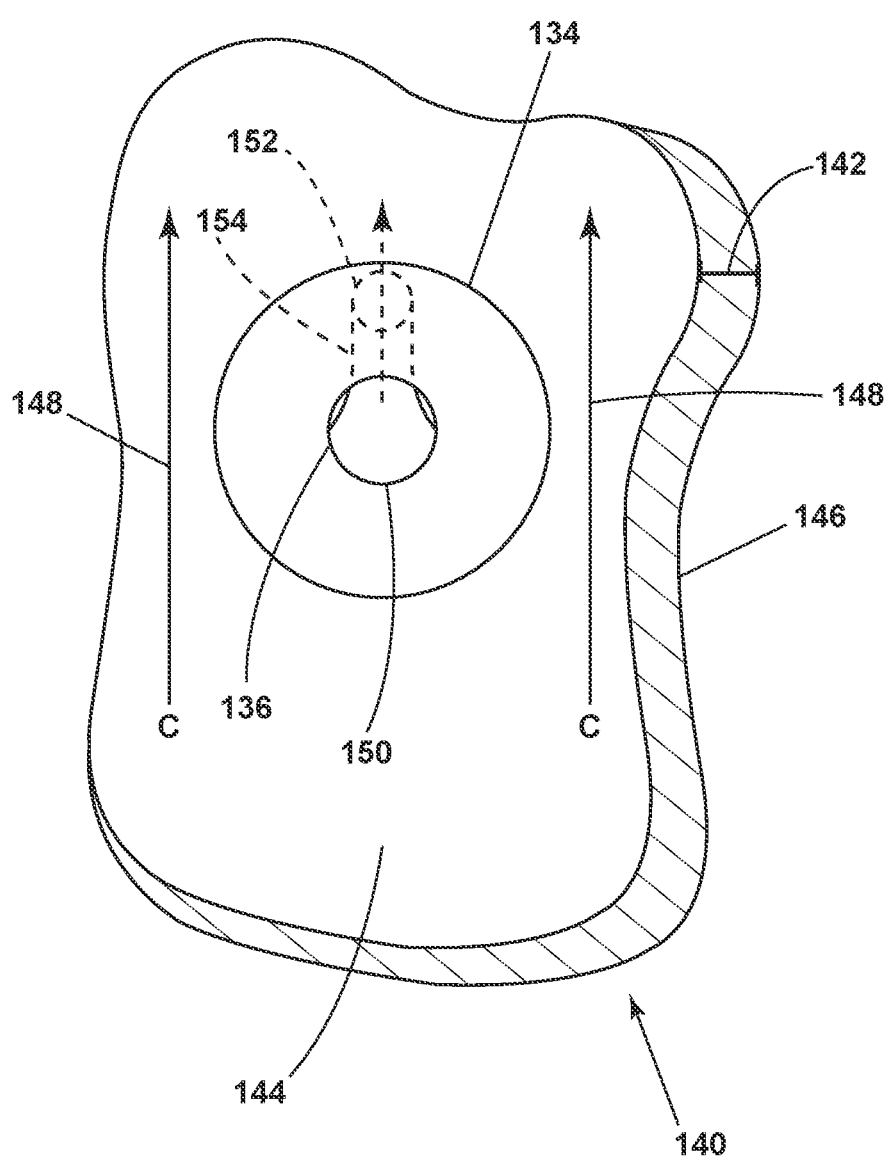
FIG. 4 is a perspective view of the wall having the protuberance with the film hole extending through the protuberance and the wall.

FIG. 4 illustrates one protuberance 134 having a film hole 136 extending through the protuberance 134. The protuberance can be non-rectilinear, including a non-linear surface extending from the first side 144 to the inlet 150, with the inlet 150 being rounded, transitioning into the film hole 136. In the top view shown, the protuberance is circular. In other non-limiting examples, the protuberance can be oval, elliptical, spherical, ellipsoidal, or curvilinear. The protuberance 134 can be symmetrical, being even about an axis parallel to the direction of a cooling fluid flow C. The protuberance 134 is disposed on a wall 140. The wall 140 can be the outer wall 112, for example, or any other component wall having a film hole 136. The wall 140 has a nominal thickness 142, having a first side 144 and a second side 146 defining a consistent nominal thickness 142 between the sides 144, 146. The protuberance 134 is a circular extension, extending from the first side 144 into a first fluid flow 148. The film hole 136 is disposed in the center of the circular protuberance 134, having an inlet 150 and an outlet 152. A passage 154 couples the inlet 150 to the outlet 152.

The nominal thickness 142 can be the thickness for the wall 140 defined as the distance between the first and second side 144, 146. Such a nominal thickness 142 can be determined in many different ways. For example, the nominal thickness 142 for the wall can be a function of the thermal load on the wall 140, the airfoil 92, or the engine component. In other examples, the nominal thickness 142 can be a function of a vibratory force acting on the wall 140, a pressure differential between on opposing sides of the wall 140, or the manufacturer required load for the wall 140 during operation. It should be appreciated that the nominal thickness 142 can be determined by multiple methods, such that a minimum operational thickness for the particular wall 140 is determined. Additionally, the nominal thickness 142 is a minimal operational thickness of the wall 140, being a function of the thermal load, vibratory force, pressure differentials, load requirements, or other similar method can be respective of minimal operation requirements to maintain safe operation of the engine and individual engine components. The nominal thickness 142 for the wall 140 can reduce engine weight, increasing engine efficiency or performance.

Figure 5:
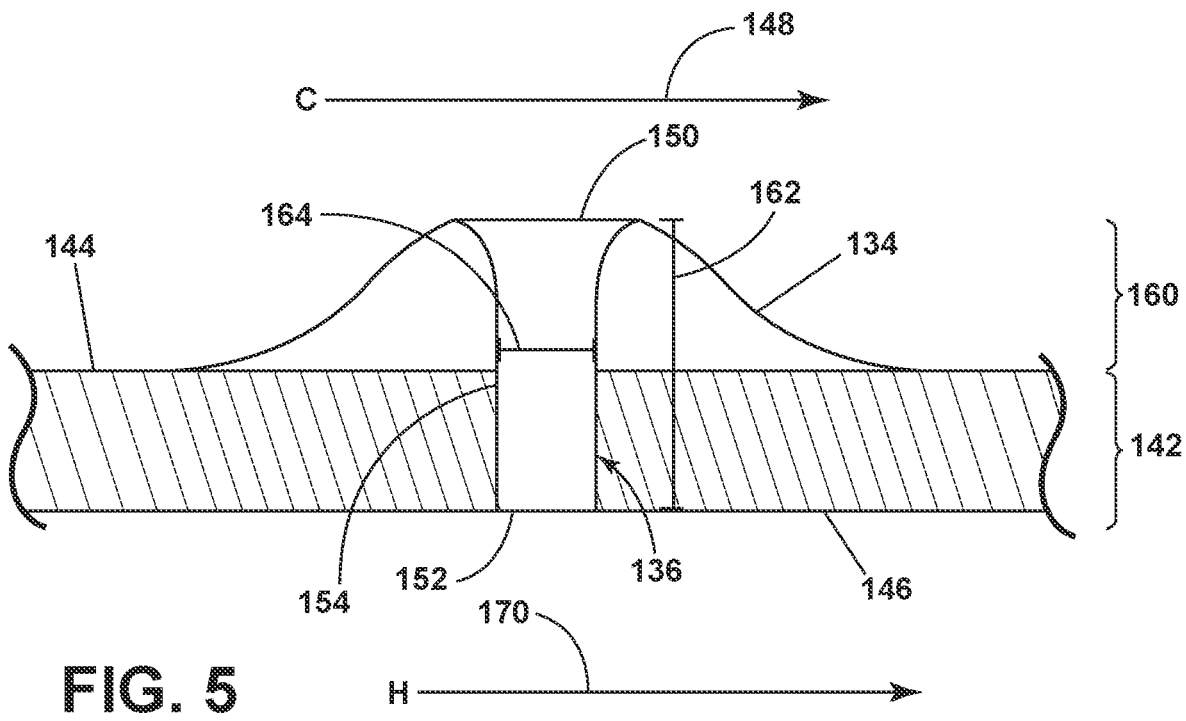
FIG. 5 is a cross-sectional view of the wall of FIG. 4 illustrating a profile of the protuberance and film hole across a direction of a cooling fluid flow.

Referring to FIG. 5, the first side 144 can be a cool side or cool surface, adjacent to a first fluid flow 148, such as a cooling fluid flow C. The second side 146 can be a hot side, or a hot surface, adjacent to a second fluid flow 170, such as a hot gas flow H. The profile view of the protuberance 134 in FIG. 5 illustrates a height 160 of the protuberance 134. The height 160 is the maximum distance the protuberance 134 extends from the wall 140. The height 160 can be determined in multiple different ways. For example, the height 160 can be a function of the nominal thickness 142. In one example, the height 160 can be at least 50% of the nominal thickness 142. In another example, the height 160 can be equal to the nominal thickness 142, or greater. In yet another example, the height can be equal to at least 100% of the nominal thickness 142. It should be appreciated that the height 160 can be anywhere from 5% of the nominal thickness 142 to 200% of the nominal thickness 142 or greater.

Alternatively, the height 160 can be a function of the film hole 136. A length 162 of the film hole 136 can be defined as the distance between the inlet 150 and the outlet 152. The height 160 can be a function of the length 162, where a particular film hole 136 can require a particular length 162 to provide an effective flow of fluid. For example, the height 160 can be at least 50% of the length 162. While FIG. 5 illustrates a linear film hole 136, it should be understood that the film hole 136 need not be linear, and with such a film hole, the length 162 can be measured as the streamline distance between the inlet 150 and the outlet. It should be appreciated that the film hole 136 as illustrated in FIG. 5 is a perpendicular film hole 136. In the case of the non-linear film hole, the length 162 will increase. As such, it should be appreciated that in such a case, the height 160 can be at least 30% of the length 162.

In yet another example, the height 160 can be determined as a function of a diameter 164 of the film hole 136. A particular diameter 164 for a film hole may be required by an engine component, in order to keep structural integrity of the engine component. The diameter 164 can require a particular length 162 for the film hole 136 to maintain an effectiveness, defining a required length-to-diameter ratio (L/D) for the film hole 136. As such, the diameter 164, or the L/D ratio can be used to define the height 160 in order to provide sufficient film hole effectiveness.

Figure 6:
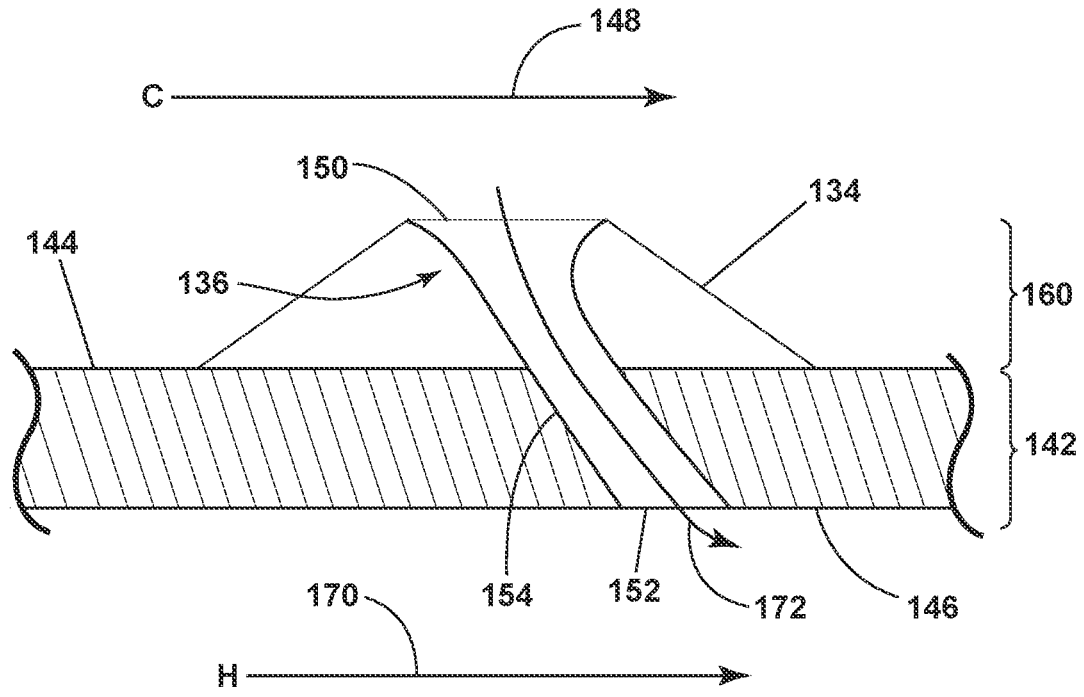
FIG. 6 is a cross-sectional view of the wall of FIG. 4 illustrating a profile of the protuberance and film hole in the direction of the cooling fluid flow.

Referring now to FIG. 6, a side profile view of the protuberance 134 illustrates one orientation of the film hole 136. The protuberance 134 can be conical, having a portion removed at the inlet 150 of the film hole 136. Alternatively, it is contemplated that the protuberance 135 can have a conic profile, having the inlet 150 disposed on one of the sides of the protuberance. The first cooling flow 148 can be a cooling fluid flow C. A second fluid flow 170, adjacent to the second side 146 of the wall 140, can be a hot gas flow H. The film hole 136 can be angled in the direction of one of the first and second fluid flows 148, 170, or both. As such, the inlet 150 can be positioned upstream of the outlet 152 relative to the cooling fluid flow C. In an example where the film hole 136 is a film hole, the cooling fluid flow C can be provided through the film hole 136 to the second side 146 as a cooling film 172 to cool the engine component.

Figure 7:
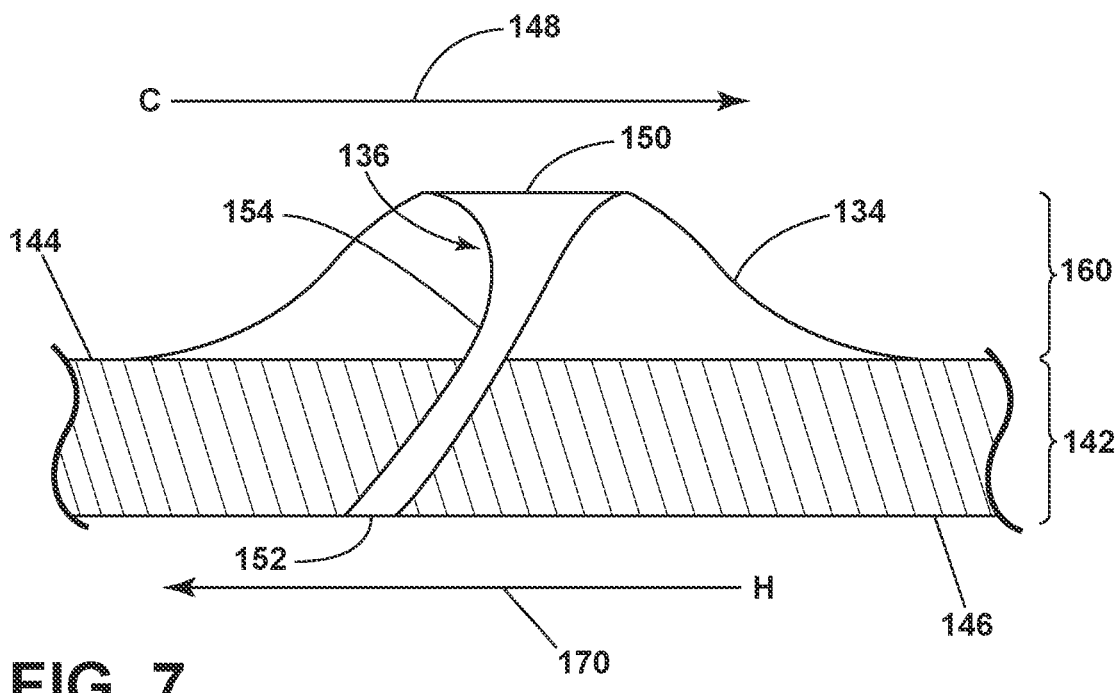
FIG. 7 is a cross-sectional view of another embodiment of the film hole extending in a direction opposite of the cooling fluid flow.
Figure 8:
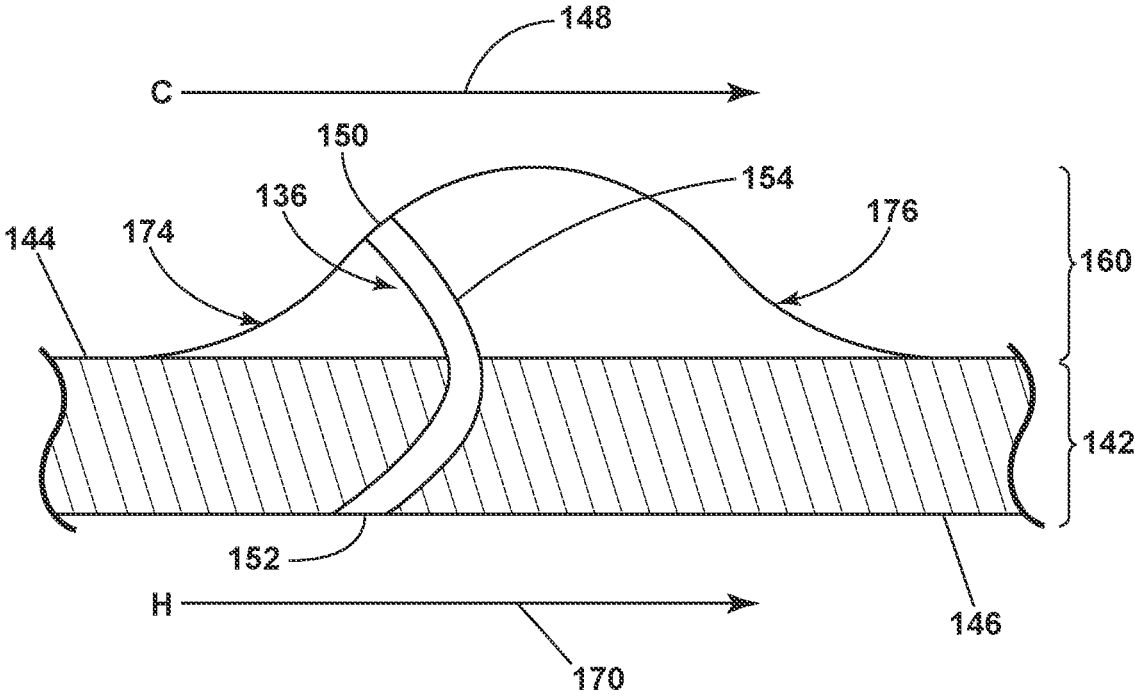
FIG. 8 is a cross-sectional view of yet another embodiment the film hole having an inlet on a forward face of the protuberance.

FIG. 7 illustrates another embodiment of the protuberance 134 having a rounded dimension with a frustoconical shape at the inlet 150 of the film hole 136. The film hole 136 includes the inlet 150 disposed downstream of the outlet 152 relative to the cooling fluid flow C. Such an orientation can be advantageous for providing an effective film hole length as well as providing multiple directional capabilities for exhausting a fluid from the film hole 136. FIG. 8 illustrates another embodiment, having a rounded protuberance having the film hole 136 with an inlet 150 offset from the center of the protuberance 134. The protuberance 134 can be divided into an upstream side 174 and a downstream side 176. The inlet 150 can be disposed on the upstream side 174. Such an orientation can be advantageous for determining flow rate entering the film hole 136. Alternatively, it is contemplated that the inlet 150 can be disposed on the downstream side 176, or any other position on the protuberance 134.

It should be appreciated that the position and orientation of the film hole 136 of FIGS. 5-8 is exemplary. The position of the inlet 150, outlet 152, and dimension of the passage 154 disposed therebetween can be adapted to control flow rates through the film hole 136, or adapt the length 162, diameter 164, or length-to-diameter ratio for the film hole 136 to provide effective cooling through the film hole 136. Furthermore, it is contemplated that the film hole 136 can be provided with inlet shaping or outlet shaping, to provide a more deterministic flow for a cooling fluid passing through the cooling flow. Such an example would be a diverging outlet which can provide a cooling fluid over a greater cross-sectional area of the engine component.

Additionally, it should be appreciated that the protuberance 134 can have a height 160 dependent on portions of the engine component, such as the nominal thickness 142, the length 162, diameter 164, or L/D ratio of the film hole 136.

Figure 9:
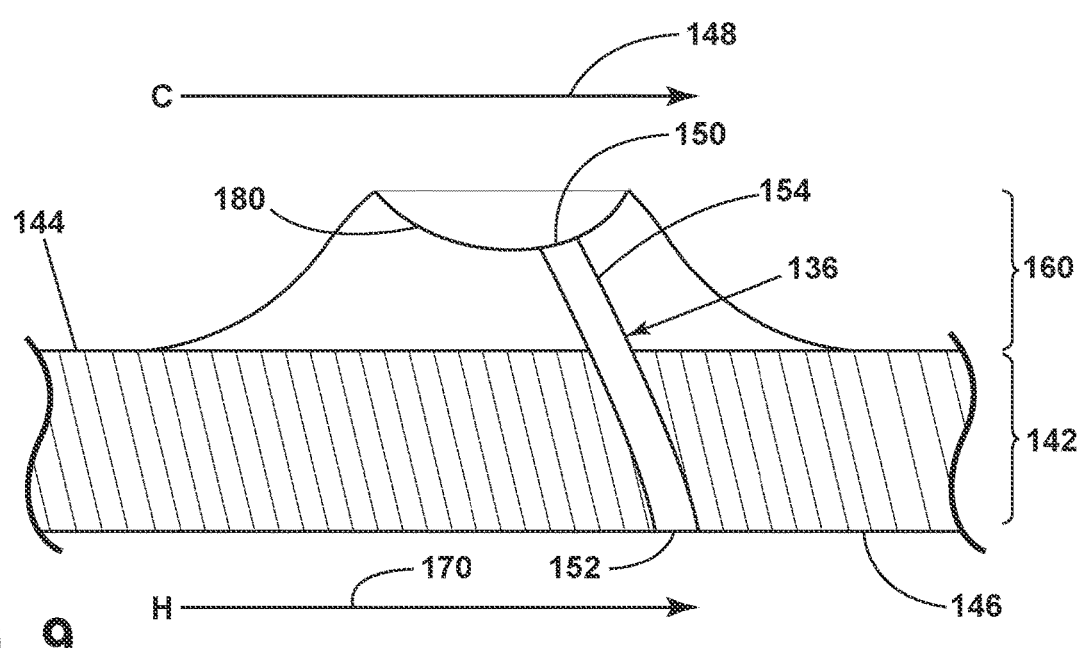
FIG. 9 is a cross-sectional view of the protuberance having a recess with the film hole inlet disposed in the recess.

Referring now to FIG. 9, a recess 180 can be formed in the protuberance 134. The recess 180 can be machined as part of the protuberance 134, such as during additive manufacturing, or can be removed from the protuberance 134 to form the recess 180. The recess 180 can be symmetrical, such as a hemispherical shape, while any shape is contemplated. In other non-limiting examples, the recess 180 can be a rectilinear shape, or an arcuate or radiused shape, or any combination thereof. The film hole 136 can be disposed in the recess 180, having the inlet 150 at least partially formed within the recess 180. The size or shape of the recess 180 can be used to control the flow rate of a flow of fluid provided to the film hole 136, or to further reduce component weight in combination with the nominal thickness 142 for the wall 140.

Figure 10:
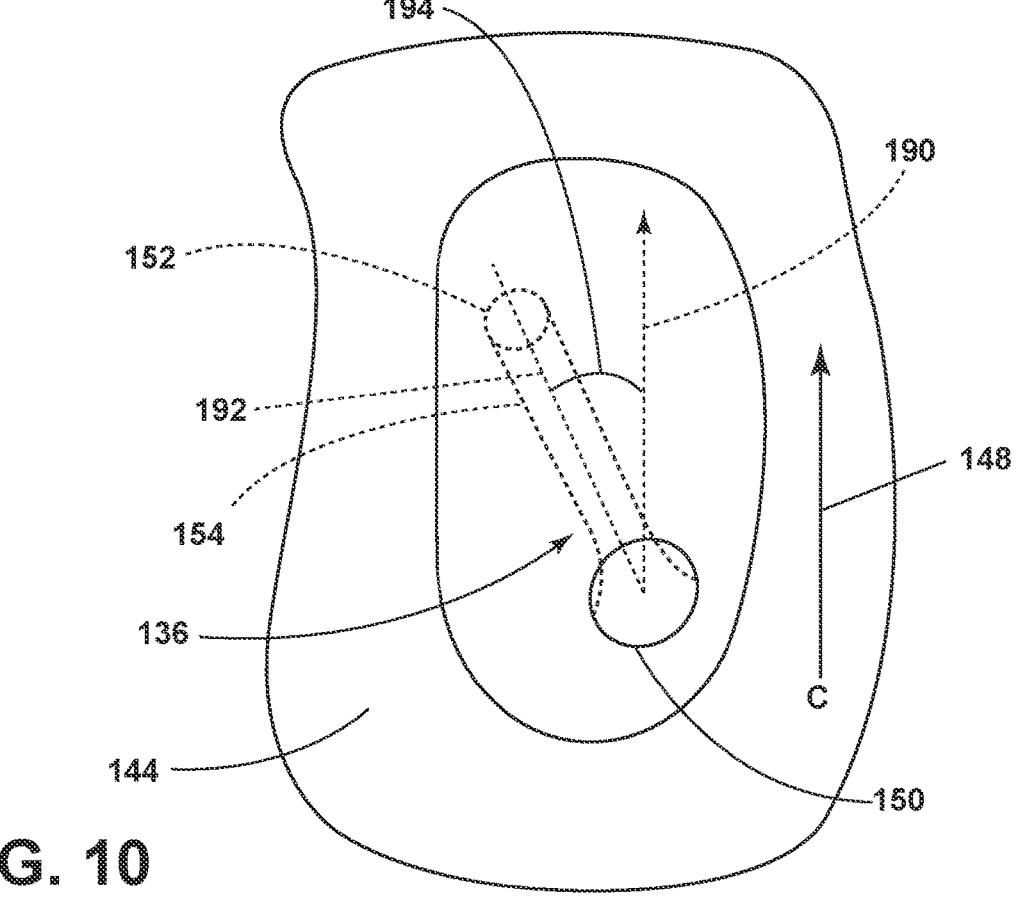
FIG. 10 is a perspective view of an elongated protuberance having a film hole offset form the direction of the cooling fluid flow.

Referring now to FIG. 10, the protuberance 134 can be asymmetrical, having an elongated or offset shape. Such as shape may be desirable to optimize fluid flows within the engine component or for directing a flow toward one or more film holes 136. Additionally the film hole 136 can be offset from the direction of the first fluid flow 148 along the engine component. The discrete direction of the first fluid flow 148 at the protuberance 134 can be transposed on the protuberance 134 as a transposed axis 190. The passage 154, shown in a linear example while non-linear film holes are contemplated, can define a passage axis 192. A film hole angle 194 can be defined between the transposed axis 190 and the passage axis 192 to define the offset relationship of the film hole 136 to the first fluid flow 148. Additionally, the film hole 136 can be angled relative to a local normal between the first and second sides 144, 146.

It should be understood that the offset orientation of the film hole 136 or the protuberance 134 can be discrete, relative to an adjacent flow of fluid which can change direction or magnitude at different portions of the engine component. As such, a plurality of protuberances 134 along the engine component can be aligned or patterned, while some of the protuberances 134 or film holes 136 are offset from the direction of the first fluid flow 148 at a portion of the engine component.

A method of cooling an engine component, such as the airfoil 92, can include a cool surface, such as the first side 144. The method can include passing a cooling fluid flow C along the cool surface 144 and providing at least a portion of the cooling fluid flow C through a film hole, such as the film hole 136, in a protuberance 134 extending from the cool surface 144. Providing at least a portion of the cooling fluid flow C can include providing a portion of the cooling fluid flow through a recess 180 in the protuberance 134 prior to providing the cool fluid flow C to the film hole 136. Additionally, providing a portion of the cooling fluid flow C through the recess 180 can minimize dust accumulation at the film hole 136 or along the cool surface 144 of the engine component.

It should be understood that the airfoil 92 or other engine component requiring cooling can utilizing the film hole 136 such as a film hole disposed within the protuberance 134. The protuberance 134 provides for an increased thickness permitting an increased film hole length 162 to provide effective cooling through the film hole 136. At the same time, the use of a protuberance 134 permits the remaining portions of the engine component to have a nominal thickness 142, which reduces component weight, reducing overall engine weight. A reduced weight provides for better engine efficiency.

It should also be understood that the protuberances 134 are discrete, having no greater an area than necessary to provide for the casting, drilling, or otherwise forming the film holes 136 through the protuberances 134 in order to have an increased length, diameter, or L/D ratio for the film hole 136 which would otherwise be unachievable within the nominal thickness 142 of the engine component, due to the nominal thickness 142 to manufacturing capabilities of the engine component at the nominal thickness 142.

Furthermore, the protuberances 134 are radiused, reducing drag or resistance caused by the extension of the protuberance 134 into the flow of fluid, such as the cooling fluid flow C, adjacent the protuberance 134. Further still, the radiused protuberances 134 or recesses 180 therein can provide for reduced dust accumulation, increasing component lifetime or reducing required maintenance.

It should be appreciated that the airfoil, engine components, protuberances, or film holes described herein can be formed by additive manufacturing. Such manufacturing can be used to develop the intricate details of the aforementioned, such as specific film hole shaping without the poor yields of such manufacturing as casting, or the imperfections associated with other manufacturing methods such as film hole drilling.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil comprising:
an exterior wall having an interior surface and an exterior surface, the interior surface at least partially defining an interior of the airfoil;
a protuberance formed along the interior surface and extending into the interior, with the protuberance extending a height from the interior surface, the height being a distance perpendicular to the interior surface at the protuberance;
a film hole extending along a centerline through the exterior wall between an inlet and an outlet, the inlet provided within a portion of the protuberance and the outlet provided along a portion of the exterior surface; and
a concave recess provided entirely along a portion of the protuberance, with the inlet being provided along a portion of the concave recess.

2. The airfoil of claim 1, wherein the protuberance includes opposing surfaces extending from the interior surface and to the concave recess.

3. The airfoil of claim 2, wherein at least a portion of the opposing surfaces includes a concave surface.

4. The airfoil of claim 2, wherein the protuberance is non-symmetric about a plane intersecting a halfway point between where the opposing surfaces meet the interior surface, the plane being perpendicular to the interior surface.

5. The airfoil of claim 2, wherein the protuberance is symmetric about a plane intersecting a halfway point between where the opposing surfaces meet the interior surface, the plane being perpendicular to the interior surface.

6. The airfoil of claim 1, wherein the protuberance is non-symmetric about a local normal between the exterior surface and the interior surface, with the local normal intersecting an apex of the protuberance.

7. The airfoil of claim 1, wherein the protuberance includes a center point when viewed along a plane planform to the interior surface, with the center point being offset from the centerline at the inlet.

8. The airfoil of claim 1, wherein the exterior wall extends a nominal thickness between the interior surface and the exterior surface where the protuberance is provided along the interior surface, with the height less than or equal to 200% of the nominal thickness and greater than or equal to 50% of the nominal thickness.

9. The airfoil of claim 1, wherein the film hole extends a length along the centerline, and the height is greater than or equal to 30% of the length.

10. The airfoil of claim 1, wherein the exterior wall extends a nominal thickness between the interior surface and the exterior surface where the protuberance is provided along the interior surface, with the height being greater than or equal to 5% and less than or equal to 200% of the nominal thickness, wherein the film hole extends a length along the centerline, and wherein the length is greater than a sum of the height and the nominal thickness.

11. The airfoil of claim 1, wherein the film hole is a curvilinear film hole.

12. The airfoil of claim 1, wherein the protuberance includes a rounded, a conical, a frustoconical, or non-rectilinear cross-sectional area when viewed along a local normal plane extending between the interior surface and the exterior surface.

13. The airfoil of claim 1, wherein the concave recess is axially spaced from the interior surface, with respect to the centerline.

14. The airfoil of claim 1, wherein the film hole extends a length along the centerline, and include a diameter defined as a maximum radial distance of the film hole with respect to the centerline, with the diameter being smaller than the length.

15. The airfoil of claim 1, wherein a film hole angle is formed between a transposed axis and the centerline at the outlet of the film hole, the transposed axis being defined as a direction of a fluid flow over the protuberance, the film hole angle being non-zero.

16. An airfoil comprising:
an exterior wall having an interior surface and an exterior surface, the interior surface at least partially defining an interior of the airfoil;
a protuberance formed along the interior surface and extending into the interior, with the protuberance extending a height from the interior surface, the height being a distance perpendicular to the interior surface at the protuberance;
a film hole extending along a centerline through the exterior wall between an inlet and an outlet, the inlet provided along a portion of the protuberance and the outlet provided along a portion of the exterior surface, the film hole extending a length along the centerline, with the height being greater than or equal to 30% of the length; and
a concave recess defined in a portion of the protuberance, wherein the inlet is defined in a portion of the concave recess.

17. The airfoil of claim 16, wherein the height is greater than or equal to 50% of the length.

18. The airfoil of claim 16, wherein the protuberance includes opposing surfaces extending from the interior surface and to the inlet, with at least a portion of the opposing surfaces includes a concave surface.

19. An airfoil comprising:
an exterior wall having an interior surface and an exterior surface, the interior surface at least partially defining an interior of the airfoil;
a protuberance formed along the interior surface and extending into the interior, with the protuberance extending a height from the interior surface, the height being a distance perpendicular to the interior surface at the protuberance;
a curvilinear film hole extending along a centerline through the exterior wall between an inlet and an outlet, the inlet provided along a portion of the protuberance and the outlet provided along a portion of the exterior surface, the curvilinear film hole extending a length along the centerline; and
a concave recess formed in a portion of the protuberance, wherein the inlet is defined in a portion of the concave recess.

20. The airfoil of claim 19, wherein a first portion of the curvilinear film hole includes a first portion and a second portion interconnected by a bend, wherein:
the first portion extends in a first direction from the inlet to the bend, the first direction having a first component parallel to the interior surface; and
the second portion extends in a second direction from the bend to the outlet, the second direction having a second component parallel to the interior surface and being opposite the first component.

* * * * *